United States Patent
Copass

(10) Patent No.: US 8,495,314 B2
(45) Date of Patent: Jul. 23, 2013

(54) SOURCE SIDE WEAK EVENT IMPLEMENTATION

(75) Inventor: Benjamin J. Copass, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 345 days.

(21) Appl. No.: 12/893,638

(22) Filed: Sep. 29, 2010

(65) Prior Publication Data

US 2012/0079217 A1    Mar. 29, 2012

(51) Int. Cl.
*G06F 12/00*  (2006.01)
(52) U.S. Cl.
USPC ............. 711/159; 711/E12.069; 711/E12.009
(58) Field of Classification Search
USPC ......................................................... 711/165
See application file for complete search history.

(56) References Cited

U.S. PATENT DOCUMENTS 8,082,399 B2 * 12/2011 Pasch et al. ................... 711/145

* cited by examiner

*Primary Examiner* — Reginald Bragdon
*Assistant Examiner* — Hamdy S Ahmed
(74) *Attorney, Agent, or Firm* — Alexander R. Kuszewski; Turocy & Watson, LLP; John M. Miller

(57) ABSTRACT

Systems and methods are presented to facilitate implementation of controlling memory management, e.g., garbage collection, of computer objects based upon determination of a source side weak event and associated components. A first class determines the existence of a listener and a second class, based upon an indication from the first class, determines whether the second class should "re-register for finalization" during execution of a finalizing operation. Where existence of the second class is maintained, existence of associated components such as the first class, a delegate, a listener, and the like, is continued and data, etc., continues to be published from the weak event to the listener. Where existence of the second class is no longer maintained (e.g., the second class does not re-register for finalization), the various components, e.g., the first class, the second class, a delegate, a listener, and any other objects are available for garbage collection.

20 Claims, 6 Drawing Sheets

MEMORY LEAKAGE

SOURCE SIDE WEAK EVENT IMPLEMENTATION

TECHNICAL FIELD

The subject specification relates generally to computer systems and in particular to computer processes and memory management.

BACKGROUND

In the field of computer science garbage collection relates to a form of automatic management of memory resources. During execution of a computer operation(s) one or more computer objects can be created and data regarding those objects can be stored in a memory. Upon completion of a computer operation, the created object(s) may no longer be required, however, if an object(s) is still being referenced, resources associated with those objects, e.g., memory, cannot be reclaimed. In effect, until unwanted objects, or other unwanted items, become unreferenced, memory can be tied up rather than being freed and available for use to another operation. As further memory is tied down by subsequent computer operations and/or other functions, memory associated, with unwanted but still referenced items, can have a detrimental effect upon subsequent processing tasks, e.g., computer processing speeds are negatively impacted, application failure, thrashing of minimal computer resources, etc.

One particular computer environment of interest for garbage collection is the Microsoft .NET Framework which supports multiple programming languages in such a manner as to facilitate language interoperability. Code can be written in one language and access functionality implemented in another. One approach to the problem of memory management for applications running in the Microsoft .NET Framework is to monitor and control memory allocation on the "listener" side of an event. An event is an action that is usually initiated outside the scope of a current class. A typical event is where a mouse pointing device is being monitored to detect when a user clicks a button on the mouse, where the click is an event. An event handler can notify any listeners waiting (e.g., listening) for the event that the event has occurred. However, at the end of a process various listeners may no longer be interested in the event and accordingly, each listener is to be removed.

During existence of a source, a strong reference between an event and a listener prevents a listener from being garbage collected. However, associating an event with a listener using a strong reference can cause unwanted memory usage, i.e., memory leaks.

By employing a weak reference between a source and a listener, allows a listener (and associated information) to be garbage collected at the termination of a process. One approach to the problem is looking for weak references on the listener side, and upon detection of a weak reference, the listener can be collected even though the event source may remain for future activity for which other listeners currently attached may continue to be attached (e.g., owing to a strong reference) or future listeners may be subsequently attached.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Various aspects disclosed herein facilitate memory management, e.g., garbage collection of memory, based upon determining the existence of components on the source side of a weak event. Existence of a listener is indicated by a first flag (e.g., associated with a first component), with a garbage collection condition of a second flag (e.g., associated with a second component) being based upon the existence of the listener, as indicated by the first flag or first component.

Where the first flag indicates that the listener is no longer associated with the weak event, the second component is in a condition for garbage collection. Upon a current or subsequent operation of a garbage collector, the second component, the first component, any associated delegate component, and the listener, as required, are collected by a garbage collector allowing any associated memory to be reclaimed and, accordingly, memory leakage to be minimized.

Where the first flag indicates that the listener is still associated with the weak event, the second component is not in a state for garbage collection. As part of a garbage collection process, a finalizer executes, and based upon the second component not being in a state for garbage collection, the second component "re-registers for finalization" thereby preventing the second component (and any associated components) from being garbage collected.

The various aspects disclosed herein present a system for automatic memory management, comprising: a first class component (e.g., a middle $class_1$ component) that indicates the existence of a listener associated with a weak event; a second class component (e.g., a middle $class_2$ component) whose condition for memory management is a function of the indication from the first class component; and a finalizer that controls memory management of the second class component and accordingly, the first class component, based upon the memory management condition of the second class component. Wherein the finalizer enables memory management of the first class component and the second class component when the first class component indicates the listener no longer exists. Wherein the finalizer also disables memory management of the first class component and the second class component when the first class component indicates existence of the listener. The system further comprises a delegate component associated with the second class component, wherein the finalizer controls memory management of the delegate component. In another aspect, the first class component and the second class component are created when the listener subscribes to the weak event. In a further aspect, the first class component and the second class component are created on a source side of the weak event. In another aspect, collection of the second class component by the finalizer can be prevented by having the second class component "re-register for finalization". "Re-registering for finalization" prevents the second class component from being collected during the current execution of the finalizer, and for as long as the second class component is to remain in existence, the second class component "re-registers for finalization" for each execution of the finalizer. In one aspect, "re-registering for finalization" can involve the second class component calling a method to re-register for finalization, which in effect facilitates a request by the second class component to be kept in existence beyond the current execution of the finalizer.

While the second class component is in existence, the first class component, and any associated delegate component are also in existence and prevented from garbage collection.

The various aspects disclosed herein further present a method for controlling automatic memory management, comprising: determining the existence of an entity associated with a weak event; selectively changing a first status as a function of the determining; selectively altering a second status as a function of the first status; and controlling memory management as a function of the second status. In one aspect, the selective altering comprises altering the second status to enabled when the entity no longer exists. In another aspect, the selective altering comprises altering the second status to disabled when the entity exists. In a further aspect, the controlling memory management comprises controlling memory management of a delegate as a function of the second status. In another aspect, the first status and the second status are operating on a source side of the weak event associated with the entity. In a further aspect, the controlling comprises re-registering for finalization or the controlling comprises an absence of re-registering for finalization.

The various aspects disclosed herein also present a system for controlling automatic memory management, comprising: means for determining the existence of an entity associated with a weak event; means for selectively changing a first status as a function of the determining; means for selectively altering a second status as a function of the first status; and means for controlling memory management as a function of the second status. In one aspect, means are presented for altering the second status to enabled when the entity no longer exists. In another aspect, means are presented for altering the second status to disabled when the entity exists. In a further aspect, the first status and the second status are operating on a source side of the weak event. In another aspect, means are presented for controlling memory management by re-registering for finalization to be performed.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
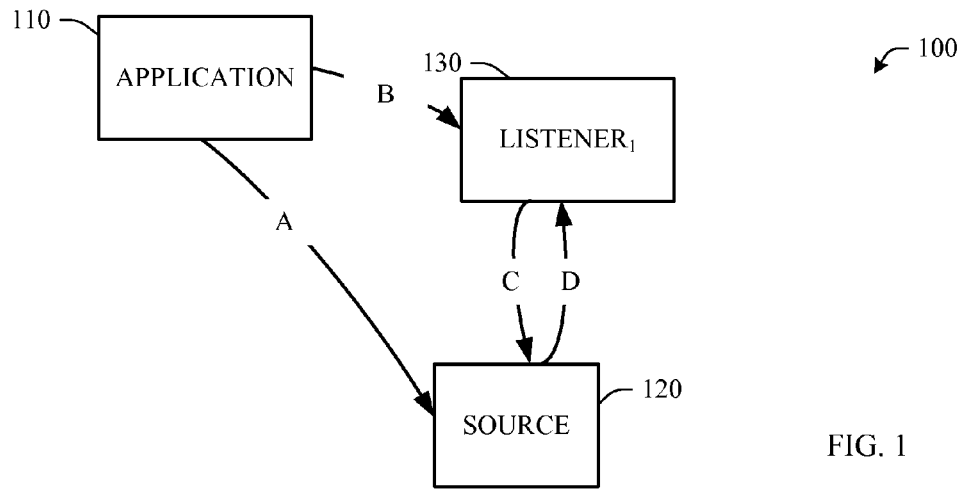
FIG. 1 illustrates a system for associating a listener with a source.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

FIG. 1 illustrates system 100 for associating a listener with a source. System 100 comprises an application component 110 operating with a source component 120, and a listener$_1$ component 130. During execution of application component 110, listener$_1$ component 130 can be associated with an event occurring at source component 120. A plurality of strong references A, B, C, and D, can be created between the respective components 110, 120, and 130, such that listener$_1$ component 130 is not reclaimed during garbage collection. An event can be where a physical action is performed, e.g., a user clicks a button on the mouse. Another example is where an application is executed and during execution a value is generated from a data source. A listener (e.g., listener$_1$ component 130), or other entity, e.g., a parameter list, can be listening for the value generation event, whereupon execution of the event the generated value populates the parameter list. Further, but not limited to, an event can be a piece of application-level information from the underlying framework, e.g., a GUI toolkit. GUI events include key presses, mouse movement, action selections, and timers expiring. On a lower level, events can represent availability of new data for reading a file or network stream. Events can be created by the underlying framework based on interpreting lower-level inputs, which may be lower-level events themselves. For example, mouse movements and clicks being interpreted as menu selections. Events can initially originate from actions on the operating system level, such as interrupts generated by hardware devices, software interrupt instructions, or state changes in polling. As utilized herein, a "listener" can be a user and/or an entity (e.g., a parameter list, a computer, the Internet, and so forth . . . ) Further, the source and the listener can reside in different layers of an application architecture, whereby the data source can reside in an application layer, while the listener (e.g., the parameter list) can reside in a graphical user interface (GUI) layer, and the listener can be garbage collected to prevent memory leakage arising from the GUI layer.

Figure 2:
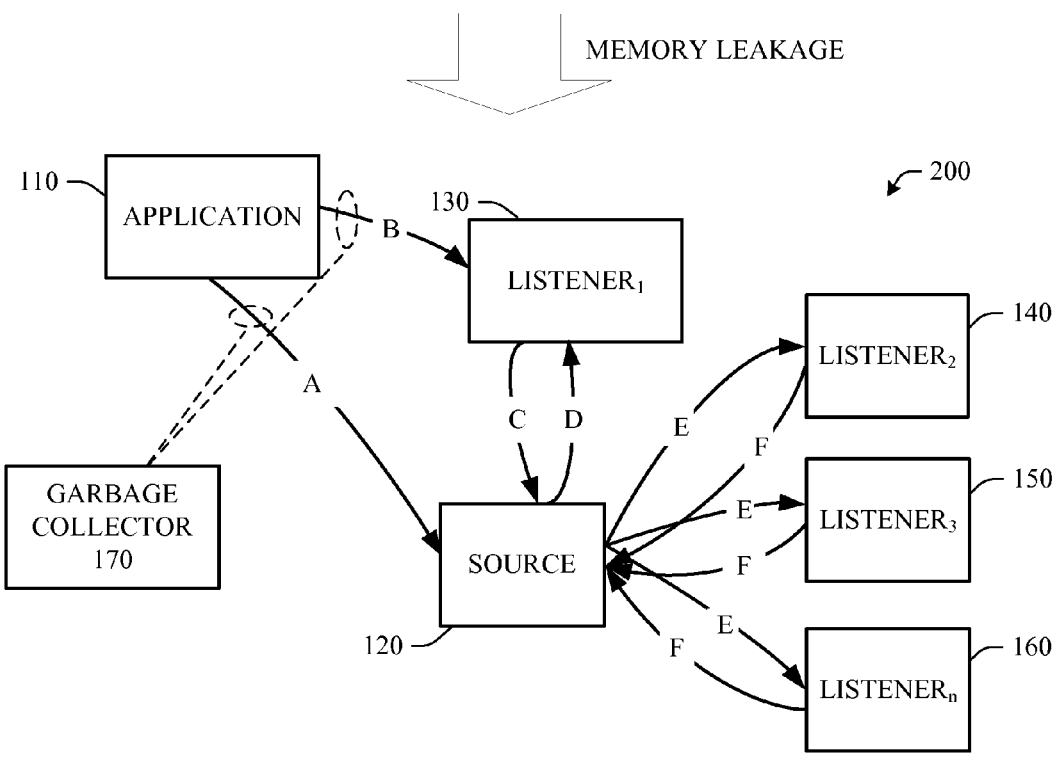
FIG. 2 illustrates a system that can create memory leakage of computer memory.

FIG. 2 illustrates system 200 that can facilitate memory leakage of computer memory. Similar to the system of FIG. 1, system 200 comprises an application component 110, a source component 120, and a listener$_1$ component 130. System 200 also comprises listener$_{2-n}$ components 140-160, and garbage collector component 170. As shown in FIG. 2, a plurality of listeners$_{1-n}$ (components 130, 140, 150, and 160) are associated with source component 120, whereby the additional listeners$_{2-n}$ components 140-160 have extended the object graph depicted in FIG. 1 (system 100) to that shown in FIG. 2 (system 200). System 200 extends the object graph of system 100, by additional listener$_{2-n}$ components, where n is an integer greater than or equal to 1. Listener$_1$ component 130 is currently of interest to application component 110, and has strong references C and B between the source component 120 and listener$_1$ component 130. Listener$_{2-n}$ components 140-160 are listeners that are remaining from previous events but owing to the strong references, strong references E and F, between the respective listener$_{2-n}$ component 140-160 and the source 130, listener$_{2-n}$ components 140-160 are unable to be reclaimed during garbage collection (e.g., by garbage collector component 170) and accordingly, memory leakage occurs with respect to any memory that is being occupied by objects associated with listener$_{2-n}$ components 140-160. It is to be appreciated, that while strong references E and F are illustrated in FIG. 2, it is the strong reference(s) E between source 120 and a respective listener$_{2-n}$ component 14-160 that prevents garbage collection, strong references F are not employed during garbage collection. As a garbage collector component 170 navigates through the object map comprising system 200 the associations between application component 110, source component 120, and listener$_{1-n}$ components 130-160 are all strong references. The garbage collector component 170 can navigate from application component 110 to source component 120 by strong reference A, from source component 120 the garbage collector component 170 traverses strong references D and E to the respective listener$_{1-n}$ components 130-160, and further, navigates strong references C and F between listener$_{1-n}$ components 130-160 and source component 120.

Figure 3:
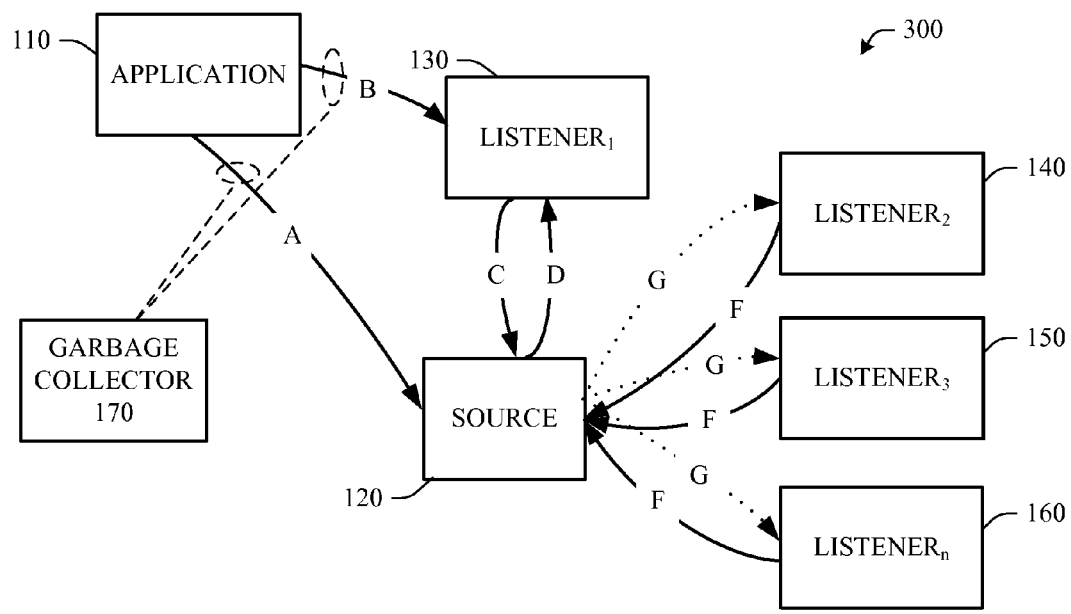
FIG. 3 illustrates a system comprising strong and weak references to prevent memory leakage, in accordance with an aspect.

Turning to FIG. 3, illustrated is system 300 where formerly strong references (references E as shown in FIG. 2) between source component 120 and listener$_{2-n}$ components 140-160 are now associated by weak references G. As mentioned previously, a weak reference facilitates removal of a listener (and associated information) by a garbage collector (e.g., garbage collector component 170). Hence, unlike the object map (system 200) of FIG. 2, as garbage collector component 170 navigates the object map (system 300) of FIG. 3, strong references still exist between application component 110, source component 120, and listener$_1$ component 130 (respective strong events A, B, C, and D) preventing garbage collection therebetween, e.g., listener$_1$ component 130 is not removed by the garbage collector component 170. However, from source component 120 to respective listener$_{2-n}$ components 140-160 formerly strong references (e.g., FIG. 2, strong references E) are replaced by weak references G. As described supra, employing weak references G facilitates removal of listener$_{2-n}$ components 140-160 (and associated information) thereby reducing memory leakage arising from listener$_{2-n}$ components 140-160.

An approach to facilitate garbage collection is to determine at the listener whether any weak references exist. For example, in FIG. 3 as part of the garbage collection process the existence of weak references between any listener$_{2-n}$ components 140-160 and a source component 120 can be determined. An alternative approach is to determine from the source side whether any weak references exist. With the first approach of determining from the listener side, separate code has to be created and executed for each listener instance. For example, referring to FIG. 3, assuming a variety of listeners, four code instances would have to be created for listener$_{1-n}$ components (130, 140, 150, and 160). Alternatively, when determining weak references from the source side, only one code instance is required and can have incorporated therein a weak source event check for each of the listener$_{1-n}$ components (130, 140, 150, and 160). By adopting the latter approach, a more efficient system can be created, e.g., only one set of code has to be created from the source side, while multiple instances have to be created on the listener side in accordance with how many listeners are subscribed to the source.

Figure 4:
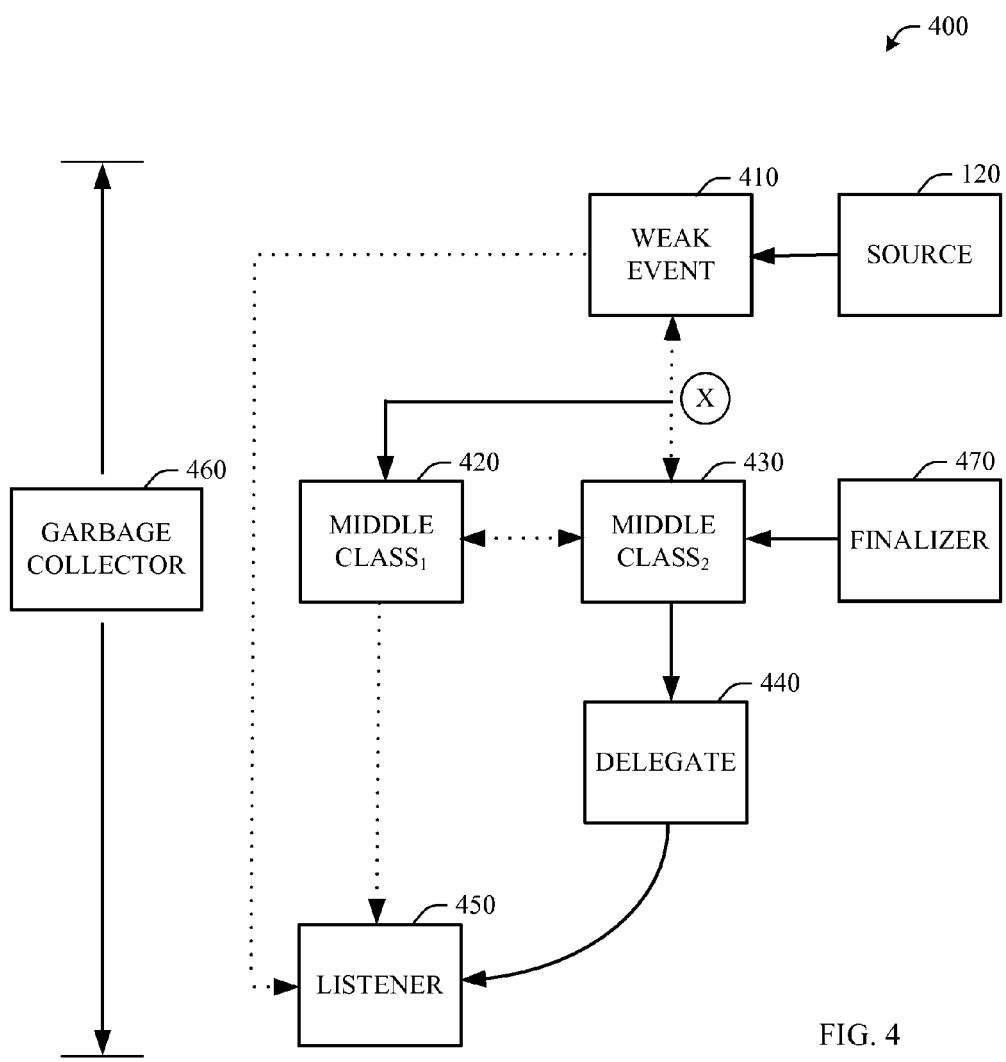
FIG. 4 illustrates a system presenting source side weak event implementation, in accordance with an aspect.

FIG. 4 illustrates system 400 comprising various components which can be utilized in a source side weak event implementation. A weak event component 410 is created in reference to an event occurring at source component 120. Such an event can be, but is not limited to, a mouse click, data generation, an action, and the like. It is to be appreciated that a weak event can be termed a weak event based upon a reference to the event being a weak reference.

A listener component 450 can be interested in the weak event component 410, and accordingly subscribes to weak event component 410. When the listener component 450 is associated with the weak event component 410, a middle class$_1$ component 420, a middle class$_2$ component 430, and a delegate component 440 are created for the instance between the listener component 450 and the weak event component 410. It is to be appreciated that for each listener (e.g., FIG. 3, listener$_{1-n}$ components 130, 140, 150, and 160) a separate middle class$_1$ component 420, middle class$_2$ component 430, and delegate component 440 are created, e.g., to accommodate four listener$_{1-n}$ components 130, 140, 150, and 160, subscribing to weak event component 410, four middle class$_1$ components, four middle class$_2$ components, and four delegate components are created.

Delegate component 440 is a base class for delegate type(s) that provides functionality of a function pointer (e.g., an intermediary) between the weak event component 410 and listener component 450, thereby associating weak event component 410 with listener 450. For example, delegate component 440 can be a data structure that refers to a static method (e.g., listener component 450), or to a class instance and an instance method of that class.

Middle class$_1$ component 420 can indicate whether a listener component 450 is still in existence. In conjunction with middle class$_1$ component 420, middle class$_2$ component 430 determines whether any components associated with the weak event component 410 (e.g., middle class$_1$ component 420, middle class$_2$ component 430, delegate component 440, and if necessary, listener component 450) are to be garbage collected by garbage collector component 460. It is to be appreciated that while components associated with the weak event are termed middle class$_1$ component and middle class$_2$ component, any suitable term can be used to indicate a first and second component, e.g., where the components are classes, terms first class component and second class component can be employed. Further, while class components are presented, the various aspects presented herein can be applied to any computer objects that facilitate operation and functionality of the various aspects presented herein. Further, the class components can be public or non-public with regard to the weak event and/or the listener.

In one instance, middle class$_2$ component 430 determines, in conjunction with middle class$_1$ component 420, that listener component 450 is still in existence and is to proceed interacting with weak event component 410. In another instance, middle class$_2$ component 430 can infer, based on the state of middle class$_1$ component 420, that listener component 450 is still in existence and is to proceed interacting with weak event component 410. The state of middle class$_2$ component 430 is a function of the state of middle class$_1$ component 420. During garbage collection by garbage collector component 460, a finalizer component 470 can be invoked.

Finalizer component 470 can control the condition (e.g., a condition of whether to facilitate garbage collection or not) of middle class$_2$ component 430. In this instance, given that listener component 450 is still in existence and interacting with weak event component 410, middle class$_2$ component 430 is required to still be present and, accordingly, during execution of the finalizer component 470, middle class$_2$ component 430 extends its existence by re-registering for finalization. Accordingly, the components associated with the weak event component 410, e.g., middle class$_1$ component 420 component, middle class$_2$ component 430, delegate component 440, and if necessary, listener component 450, remain in existence for the next execution of garbage collector component 460 and finalizer component 470. The process of garbage collector component 460 instigating finalizer component 470 to, in conjunction with the state of middle class$_2$ component 430, continue to maintain middle class$_2$ component 430 in a condition of resurrection continues ad-infinitum until listener component 450 ceases to exist, e.g., listener component 450 is no longer subscribing to weak event component 410. It is to be appreciated that a variety of processes are available to facilitate existence of a class, e.g., middle class$_2$ component 430. One example is middle class$_2$ component 430 re-registers for finalization, preventing collection of the middle class$_2$ component 430 during current execution of the finalizer component 470, thereby delaying collection until a subsequent execution of the finalizer component 470.

In another aspect, middle class$_2$ component 430 determines based on a state of middle class$_1$ component 420 that listener component 450 is no longer interacting with weak event component 410, e.g., listener component 450 is no longer in existence. In this instance, during execution of garbage collector component 460, based upon the determination that listener component 450 no longer exists, middle class$_2$ component 430 does not re-register for finalization. Owing to the weak references existing between the middle class$_2$ component 430 and the weak event 410, the various components including and associated with middle class$_2$ component 430 e.g., middle class$_1$ component 420, middle class$_2$ component 430, delegate component 440, and if necessary, listener component 450, are available for garbage collection during a current or subsequent execution of garbage collector component 460. As discussed supra, collection of unwanted objects, etc. (e.g., middle class$_1$ component 420, middle class$_2$ component 430, delegate component 440, and if necessary, listener component 450) minimizes memory leakage and reduces associated problems.

An example of operation of the various components comprising system 400 is a GUI (not shown) receiving data from source component 120. Operation of source component 120 causes variables to be generated which are to be displayed on the GUI. Output of the variables to one or more components external to source 120 is facilitated by creation of weak event component 410. To receive variables from source component 120, a listener component 450 is generated by the GUI and listener component 450 subscribes to weak event component 410. In one aspect, the GUI is only to receive a single instance variable from source component 120, and once weak event component 410 has run, the weak reference provided by middle class$_2$ component 430 does not impede collection of the listener component 450 during an execution of garbage collector component 460. The GUI can be closed down or remain open to facilitate presentation of data, operator interaction, etc.

In another aspect, the GUI may be configured to receive further variable instances as the variables are subsequently generated by source component 120. In this aspect, listener component 450 remains in existence while data is transferred from source component 120 to the GUI. During the existence of listener component 450, garbage collector component 460 may execute on a plurality of occasions. During each execution of the garbage collector component 460, and finalizer component 470, owing to interaction between the GUI and source component 120 having to be maintained throughout, existence of the middle class$_2$ component 430 is maintained by re-registering for finalization.

Further, the GUI may only be in operation for a limited period of time. Upon completion of any task that is being performed by the GUI, e.g., presentation of data, operator interaction, etc., operation of the GUI is terminated (e.g., the GUI window is closed). GUI termination can cease existence of listener component 450, hence middle class$_1$ component 420 indicates to middle class$_2$ component 430 that listener component 450 no longer exists and, accordingly, middle class$_2$ component 430 does not re-register for finalization.

To facilitate visualization of the role of the second middle class component, reference is made to FIG. 4, item X, a weak reference. As illustrated, the middle class$_2$ component 430 component is directly associated with the weak event 410. While the middle class$_2$ component 430 is in a state where garbage collection is not to be performed, the association between the middle class$_2$ component 430 and the weak event 410 is maintained, e.g., the weak reference X exists. Accordingly, all of the other components associated with weak event 410 (e.g, middle class$_1$ component 420, middle class$_2$ component 430, and delegate component 440,) are still connected to the weak event 410, and therefore are not to be garbage collected. However, where the middle class$_2$ component 430 is in a state where garbage collection is to be performed, the weak reference X is broken, all of the other components associated with weak event 410 (e.g., middle class$_1$ component 420, middle class$_2$ component 430, delegate component 440, and if necessary, listener component 450) no longer have a weak reference X to the weak event and, accordingly, are available for garbage collection during the current or subsequent execution of the garbage collector component 460.

It is to be appreciated that while the examples above present a GUI interacting with source component 120, the aspects described herein are not so limited and can be applied to any operation involving a source, and an entity (e.g., object, method, class, etc.) interacting with the source.

Figure 5:
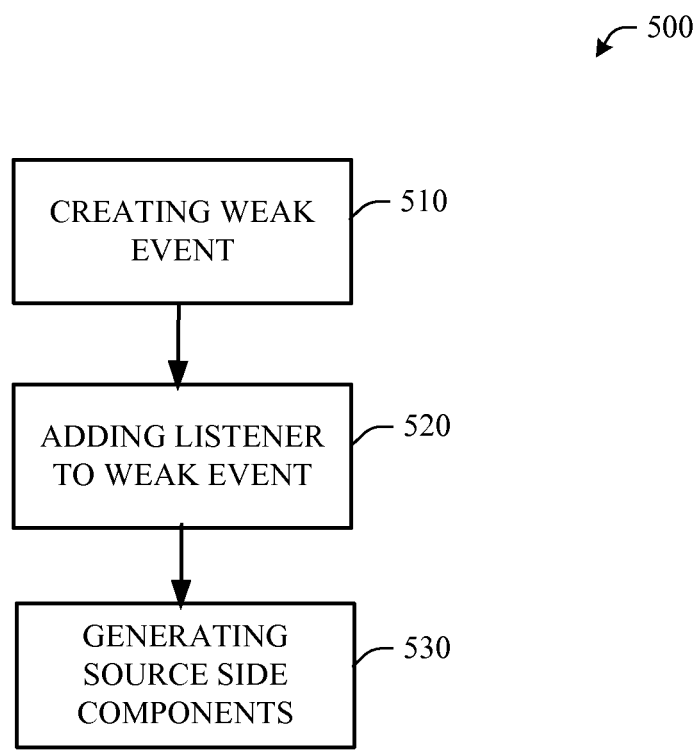
FIG. 5 illustrates an example methodology for generating source side components in accordance with an aspect.

FIG. 5 illustrates an example methodology 500 for generating components when a listener is added to a weak event. At 510, a weak event is created (e.g., weak event component 410) in association with a source (e.g., source component 120). The weak event could be caused by user interaction, such as a mouse click, or it could be triggered by some other program logic associated with the source. A weak event can be a piece of application-level information from the underlying framework, e.g., a GUI toolkit. GUI events include key presses, mouse movement, action selections, and timers expiring. On a lower level, weak events can represent availability of new data for reading a file or network stream. Weak events can be triggered by the underlying framework based on interpreting lower-level inputs, which may be lower-level events themselves. For example, mouse movements and clicks being interpreted as menu selections. Weak events can initially originate from actions on the operating system level, such as interrupts generated by hardware devices, software interrupt instructions, or state changes in polling. An event can be termed a weak event owing to a weak reference being associated with the event.

At 520, a listener, or entity, (e.g., listener component 450) is associated (e.g., subscribes to) with the weak event.

At 530, in response to the listener being associated with the weak event various components are generated on the source side to facilitate conveyance of any data, etc., associated with the weak event to the listener, and further, garbage collection (e.g., by garbage collector component 460) upon termination of interest in the weak event by the listener. The various components include a delegate, a first middle class component and a second middle class component. The delegate (e.g., delegate component 440) acts as an intermediary (e.g., a function pointer) between the weak event and the listener, thereby facilitating reference of the weak event with the listener. A first middle class component (e.g., middle class$_1$ component 420) is created and is utilized by various aspects presented herein as a means for identifying, at the time a garbage collection operation is executed, whether a listener is still in existence. A second middle class component (e.g., middle class$_2$ component 430) is, in conjunction with the first middle class component, utilized to identify whether an association exists between a listener and a weak event (e.g., is the listener still associated with the weak event). Based upon whether (or not) there is an existing association between the listener and the weak event, collection by a garbage collector (e.g., garbage collector component 460) occurs or maintained existence of the second middle class component occurs to prevent an instance of garbage collection from collecting the first middle class component, the second middle class component, and the delegate.

Figure 6:
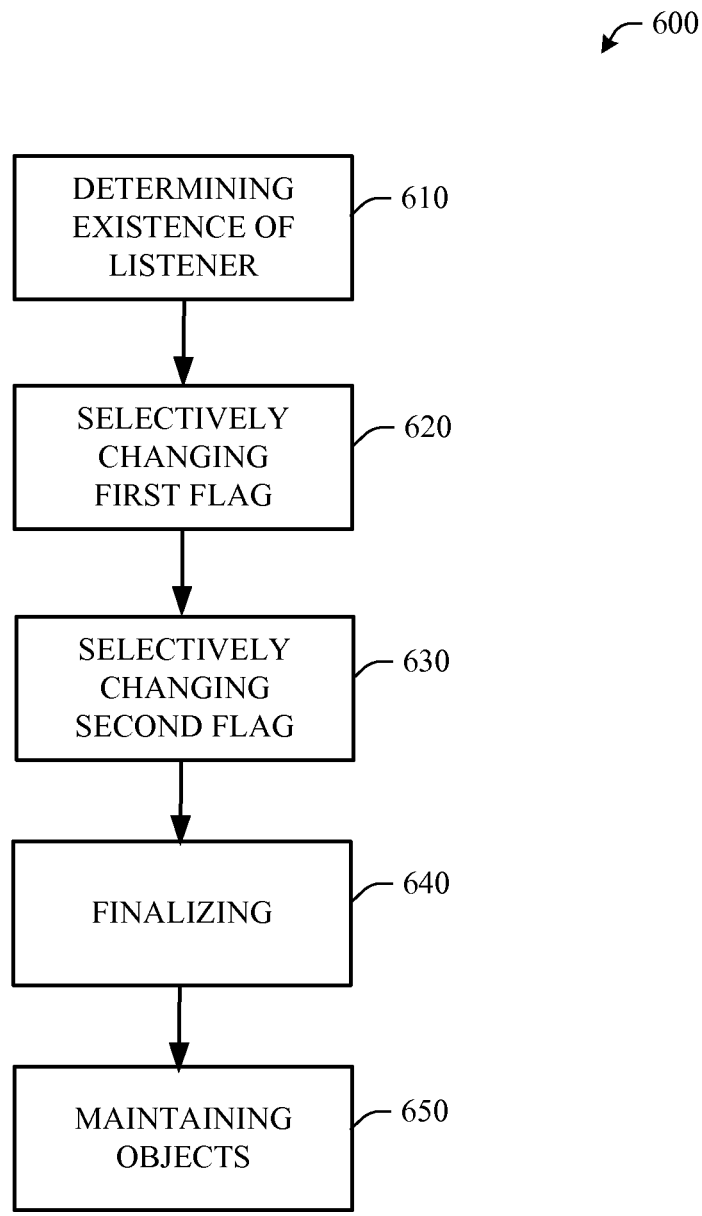
FIG. 6 illustrates an example methodology for maintaining existence of source side components in accordance with an aspect.

FIG. 6 illustrates an example methodology 600 for determining whether to allow a memory management operation, e.g., a garbage collection operation, to execute.

At 610, during execution of a garbage collection operation, the existence of a listener, or entity, being associated with a weak event is determined. A listener (e.g., listener component 450) can subscribe to a weak event (e.g., weak event component 410) and thereby receive data, events, etc., as they are published by the weak event. At any given moment a listener may discontinue subscribing to a weak event. For example, the listener may be associated with a GUI that is closed by a user thereby negating any further interaction between the GUI and any events which the GUI is associated with (i.e., subscribed to via the listener). In another example, a method associated with the listener is only to have a single execution based upon a single data, event, etc., instance being published by a weak event, upon receipt of the single instance the method is removed from the weak event. Existence of a listener being associated with a weak event can be determined by a first component (e.g., middle class$_1$ component 420).

At 620, the state of a first flag associated with the first component is selectively changed based upon the existence of the listener. In the event that the listener is determined to still be in existence, e.g., the listener is still subscribed to an event, a flag associated with the first component can be selectively changed or altered to indicate existence of the listener. It is to be appreciated that the term 'flag' can be any indicator of meaning, binary state, data structure, state, status, attribution, ability, permission, designation, intermediate state, final state, post-operation condition, and the like.

At 630, based upon the state of the first flag, a second flag can be selectively changed or altered. For example, a second component (e.g., middle class$_2$ component 430) can be monitoring the state of the first flag. Where the listener is still in existence (e.g., the associated GUI is still being interacted with, a method is awaiting a first instance of data, a method is awaiting a subsequent instance of data, and the like) the first flag acts as an indicator for which the second flag is to the set, based upon the existence of the listener.

At 640, a memory management operation (e.g., garbage collection by garbage collector component 460) is performed, or controlled, in order to minimize memory leakage in a memory resource(s). Compared with a strong reference associated with an event, where a strong event association between a source and a listener prevents garbage collection, a weak reference can be in one of a plurality of status' depending upon whether garbage collection is or is not to occur. During execution of the memory management operation, a finalizer operation (e.g., finalizer component 470) can be performed. In one aspect, the finalizer can be a method which is called during the memory management operation.

At 650, as part of the memory management operation (e.g., garbage collection by garbage collector component 460), the finalizer method executes in association with the second flag (e.g., finalizer component 470 is associated with a second component, middle class$_2$ component 420). Based upon the second flag indicating that the listener is still associated with the weak event (e.g., the first flag indicates the listener is still in existence) collection of the second component during the memory management operation is prevented/disabled. During execution of the finalizer component, the second component can "re-register for finalization". "Re-registering for finalization" prevents the second class component from being memory managed on the current execution of the finalizer. For as long as the second class component is to remain in existence, the second class component "re-registers for finalization" during each execution of the finalizer. While the second class component is in existence, the first class component, any associated delegate component and the listener are also in existence and prevented from garbage collection.

Figure 7:
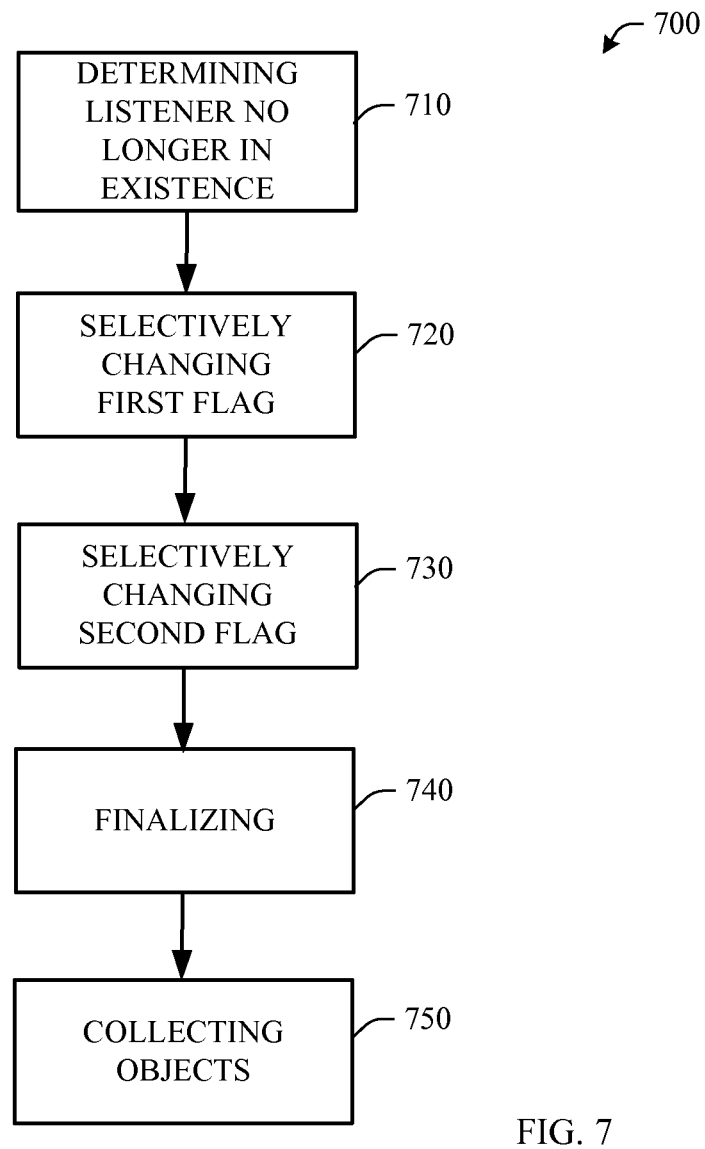
FIG. 7 illustrates an example methodology for garbage collecting source side components in accordance with an aspect.

FIG. 7 illustrates an example methodology 700 for determining whether to allow a memory management operation, e.g., a garbage collection operation to execute.

At 710, the existence of a listener, or entity, being associated with a weak event is determined. A listener (e.g., listener component 450) can subscribe to a weak event (e.g., weak event component 410) and thereby receive data, events, etc., as they are published by the weak event. A listener may discontinue subscribing to a weak event at any moment. For example, the listener may be associated with a GUI that is closed by a user thereby bring to an end any further interaction between the GUI and any events which the GUI is associated with (i.e., subscribed to via the listener). In another example, a method associated with the listener is only to have a single execution based upon a single data instance, event instance, etc., being published by a weak event, upon receipt of the single instance the method is removed from the weak event. Existence of a listener being associated with a weak event can be determined by a first component (e.g., middle class$_1$ component 420).

At 720, the state of a first flag is selectively changed based upon the existence of the listener or entity. Where the listener is determined to no longer be in existence (e.g., the associated GUI has been closed, a method has received a required number of data instances, and the like) a flag associated with the first component can be changed to indicate that the listener no longer exists. It is to be appreciated that the term 'flag' can be any indicator of meaning, binary state, data structure, state, status, attribution, ability, permission, designation, intermediate state, final state, post-operation condition, and the like.

At 730, based upon the state of the first flag, a second flag can be selectively changed. For example, a second component (e.g., middle class$_2$ component 430) can be monitoring the state of the first flag. Where the listener is no longer in existence, the first flag acts as an indicator for which the second flag is to be set, based upon the listener no longer existing, e.g., the listener is no longer subscribed to the weak event.

At 740, a memory management operation (e.g., garbage collection by garbage collector component 460) is performed as a means for minimizing memory leakage in a memory resource(s). Compared with a strong reference associated with an event, where a strong event association between a source and a listener prevents garbage collection, a weak reference can be in a plurality of states depending upon whether garbage collection is or is not to occur. As part of the memory management operation (e.g., garbage collection by garbage collector component 460), a finalizer (e.g., finalizer component 470) associated with the second flag can be executed or not (e.g., finalizer component 470 is associated with a second component, middle $class_2$ component 420).

At 750, in one aspect, during execution of the finalizer, based upon the second flag indicating that the listener is no longer in existence, (e.g., the first flag indicates the listener is no longer subscribed to the weak event) the second component does not re-register for finalization, and the garbage collection process proceeds to collect any unreferenced components, etc. By utilizing the first flag instance to indicate the listener no longer exists, the association of the second component (along with any associated delegate, first component, listener, etc.) with the weak event is no longer maintained, the various objects can be garbage collected as required to minimize memory leakage. Memory that was previously associated with any of the second component, the delegate, the first component, the listener, etc., is now freed up and available for subsequent allocation to objects, data, etc., generated and/or employed by a previous, concurrent or subsequent operation, method, component, and the like.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

As used herein, the terms to "infer" or "inference" refer generally to the process of reasoning about or deducing states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A system, comprising:
a processor;

a memory communicatively coupled to the processor, the memory having stored therein computer-executable components, comprising:
- a source component configured to generate an event to a listener component associated to the event by a weak reference;
- a first class component configured to set a first indication identifying whether the listener component is still associated with the event, wherein the first class component is associated with the source component;
- a second class component associated with the source component, wherein the second class component is configured to:
  - in response to the first indication identifying that the listener component is still associated with the event, set a second indication to identify that the second class component is in a state for memory management; and
  - in response to the first indication identifying that the listener component is not still associated with the event, set the second indication to identify that the second class component is not in a state for the memory management; and
- a finalizer component configured to:
  - in response to the second indication identifying that the second class component is in a state for the memory management, perform the memory management of the first class component and the second class component; and
  - in response to the second indication identifying that the second class component is not in a state for the memory management, not perform the memory management of the first class component and the second class component.

2. The system of claim 1, wherein the memory management comprises memory reclamation.

3. The system of claim 1, wherein the first indication is a flag.

4. The system of claim 1, further comprising:
a delegate component employed as the weak reference; and
wherein the finalizer component is further configured to:
- in response to the second indication identifying that the second class component is in a state for the memory management, perform the memory management of the delegate component; and
- in response to the second indication identifying that the second class component is not in a state for the memory management, not perform the memory management of the delegate component.

5. The system of claim 1, wherein the first class component and the second class component are configured to be instantiated in response to the listener component associated to the event by the weak reference.

6. The system of claim 1, wherein the second indication is a flag.

7. The system of claim 1, wherein the second indication identifying that the second class component is not in a state for the memory management comprises the second class component registering for finalization with the finalizer component.

8. The system of claim 1, wherein the finalizer component is further configured to:
- in response to the second indication identifying that the second class component is in a state for the memory management, perform the memory management of the listener component; and
- in response to the second indication identifying that the second class component is not in a state for the memory management, not perform the memory management of the listener component.

9. A method, comprising:
generating, by a source component of a device including a processor, an event to a listener component associated to the event by a weak reference;
determining, by a first class component associated with the source component, whether the listener component is still associated with the event;
setting, by the first class component, a first indication identifying whether the listener component is still associated with the event;
in response to the first indication identifying that the listener component is still associated with the event, setting, by a second class component associated with the source component, a second indication to identify that the second class component is in a state for memory management; and
in response to the first indication identifying that the listener component is not still associated with the event, setting, by the second class component, the second indication to identify that the second class component is not in a state for the memory management;
in response to the second indication identifying that the second class component is in a state for the memory management, performing, by a finalizer component associated with the source component, the memory management of the first class component and the second class component; and
in response to the second indication identifying that the second class component is not in a state for the memory management, preventing, by the finalizer component, the memory management of the first class component and the second class component.

10. The method of claim 9, wherein the memory management comprises memory reclamation.

11. The method of claim 9, wherein the first indication is a flag.

12. The method of claim 9, further comprising:
wherein the weak reference is a delegate component;
in response to the second indication identifying that the second class component is in a state for memory management, performing, by the finalizer component, the memory management of the delegate component; and
in response to the second indication identifying that the second class component is not in a state for memory management, preventing, by the finalizer component, the memory management of the delegate component.

13. The method of claim 9, wherein the second indication is a flag.

14. The method of claim 9, wherein the second indication identifying that the second class component is not in a state for memory management comprises registering the second class component for finalization with the finalizer component.

15. The system of claim 9, further comprising:
in response to the second indication identifying that the second class component is in a state for memory management, performing, by the finalizer component, the memory management of the listener component; and
in response to the second indication identifying that the second class component is not in a state for memory management, preventing, by the finalizer component, the memory management of the listener component.

16. A non-transitory computer-readable medium having components stored thereon that, in response to execution, cause at least one device including a processor to perform operations, comprising:
- generating, by a source component of a device including a processor, an event to a listener component associated to the event by a weak reference;
- determining, by a first class component associated with the source component, whether the listener component is still associated with the event;
- setting, by the first class component, a first indication identifying whether the listener component is still associated with the event;
- in response to the first indication identifying that the listener component is still associated with the event, setting, by a second class component associated with the source component, a second indication to identify that the second class component is in a state for memory management; and
- in response to the first indication identifying that the listener component is not still associated with the event, setting, by the second class component, the second indication to identify that the second class component is not in a state for the memory management;
- in response to the second indication identifying that the second class component is in a state for the memory management, performing, by a finalizer component associated with the source component, the memory management of the first class component and the second class component; and
- in response to the second indication identifying that the second class component is not in a state for the memory management, preventing, by the finalizer component, the memory management of the first class component and the second class component.

17. The non-transitory computer-readable medium of claim 16, wherein the first indication and the second indication are flags.

18. The system of claim 16, further comprising:
wherein the weak reference is a delegate component;
- in response to the second indication identifying that the second class component is in a state for memory management, performing, by the finalizer component, the memory management of the delegate component; and
- in response to the second indication identifying that the second class component is not in a state for memory management, preventing, by the finalizer component, the memory management of the delegate component.

19. The system of claim 16, further comprising:
- in response to the second indication identifying that the second class component is in a state for memory management, performing, by the finalizer component, the memory management of the listener component; and
- in response to the second indication identifying that the second class component is not in a state for memory management, preventing, by the finalizer component, the memory management of the listener component.

20. The system of claim 16, wherein the second indication identifying that the second class component is not in a state for memory management comprises registering the second class component for finalization with the finalizer component.

* * * * *